(12) United States Patent
Rehm et al.

(10) Patent No.: US 6,920,800 B2
(45) Date of Patent: Jul. 26, 2005

(54) METHOD FOR DETERMINING INERTIA OF AN ELECTRIC MOTOR AND LOAD

(75) Inventors: Thomas J. Rehm, Mequon, WI (US); John J. Golownia, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/641,504

(22) Filed: Aug. 15, 2003

(65) Prior Publication Data

US 2005/0034538 A1 Feb. 17, 2005

(51) Int. Cl.⁷ ............................................. B25B 23/14
(52) U.S. Cl. .................................................. 73/862.23
(58) Field of Search ....................... 73/862.23, 862.191; 318/798

(56) References Cited

U.S. PATENT DOCUMENTS

| | | | |
|---|---|---|---|
| 5,159,254 A | | 10/1992 | Teshima |
| 5,175,483 A | * | 12/1992 | Fujii et al. .................. 318/807 |
| 5,492,508 A | * | 2/1996 | Tsukamoto et al. ......... 475/125 |
| 5,495,158 A | | 2/1996 | Schmidt et al. |
| 6,490,511 B1 | | 12/2002 | Raftari et al. |

* cited by examiner

*Primary Examiner*—Max Noori
(74) *Attorney, Agent, or Firm*—Quarles & Brady, LLP; William R. Walbrun

(57) ABSTRACT

The present method can determine the inertia of an electric motor and the load driven by the electric motor in situations where the electric motor accelerates or decelerates in a non-linear manner. During acceleration and deceleration, the torque produced by the electric motor is sampled periodically and the average values for the acceleration torque and deceleration are calculated. The rates of acceleration and deceleration also are determined. These values are employed to derive a value indicating the inertia.

25 Claims, 2 Drawing Sheets

US 6,920,800 B2

METHOD FOR DETERMINING INERTIA OF AN ELECTRIC MOTOR AND LOAD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus and methods for controlling operation of electric motors, and more particularly to determining motor inertia.

2. Description of the Related Art

Some industrial electric motors are operated by a motor drive which responds to a velocity command by applying electricity to the motor in a manner that causes the motor to operate at the commanded velocity. In a typical motor drive, the velocity command is compared to a measurement of the actual velocity of the motor to produce a commanded torque indicating how the motor's operation needs to change in order to achieve the commanded velocity. For example, to accelerate the motor a positive commanded torque is produced, whereas a negative commanded torque is required to decelerate the motor.

The amount of torque that is required to produce a given change in velocity is a function of the inertia of the motor and the mechanical apparatus being driven. The inertia in a typical industrial installation is determined and programmed into the motor drive upon commissioning the motor. Thus it is desirable to provide a mechanism for accurately estimating that inertia.

The traditional process for estimating the motor system inertia involves operating the motor through a linear acceleration/deceleration profile. If the velocity changes at a constant rate, the motor torque is constant during both acceleration and deceleration and it is relatively straight forward to calculate the inertia. This is the case with drive systems that have regenerative capabilities, i.e. where the electric current induced in the stator coils during deceleration is able to flow unrestricted back into the DC supply bus for the motor drive. However, many present day motor drives incorporate a bus regulator which limits the voltage on the DC supply bus and thus restricts the regenerative capability. As a consequence, the deceleration is non-linear which can adversely affect traditional inertia estimating techniques.

Therefore, a different method for estimating the inertia is needed, one that does not require a linear acceleration/deceleration profile.

SUMMARY OF THE INVENTION

The inertia of an electric motor and a load connected to the motor is estimated by accelerating the motor from a first velocity to a second velocity. The acceleration rate is determined and the amount of torque produced by the motor is ascertained. Thereafter, the motor is decelerated from a third velocity to a fourth velocity. As the motor decelerates, the rate of deceleration is determined and an average amount of torque produced by the motor during the deceleration is detected. Specific procedures for determining the rates of acceleration and deceleration and the torque values are described herein.

An inertia value is calculated as a function of the amount of torque, the average amount of torque, the rate of acceleration, and the rate of deceleration. In the preferred embodiment, the inertia value is computed by dividing a sum of the amount of torque and the average amount of torque by a sum of the magnitudes of the acceleration and deceleration rates.

DETAILED DESCRIPTION OF THE INVENTION

Figure 1:
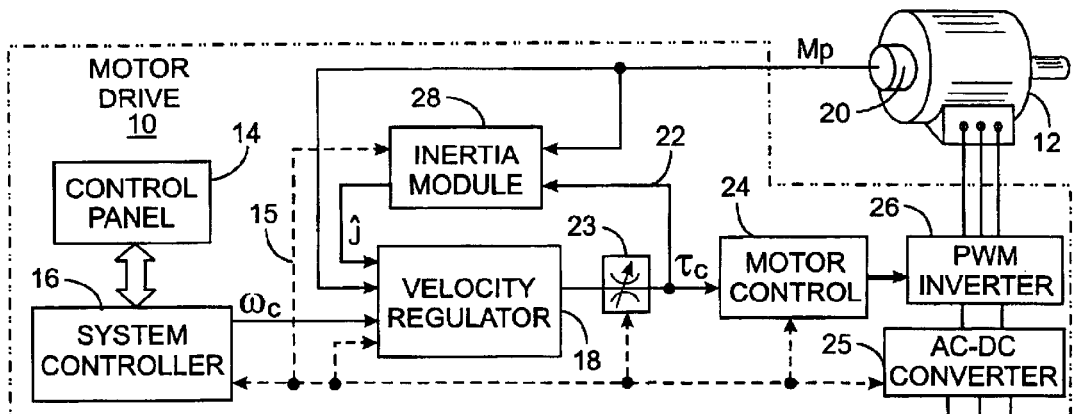
FIG. 1 is a functional block diagram of motor drive for controlling operation of an electric motor.

With initial reference to FIG. 1, a motor drive 10 controls a three-phase electric motor 12, which drives mechanical elements on a machine. The motor drive 10 has a control panel 14 which serves as a user interface by providing a keypad and a display through which an operator can enter commands and receive information about the motor's performance. The control panel 14 is connected to a system controller 16 which governs the operation of the motor drive. The system controller may have additional inputs and outputs through which commands and motor performance data are exchanged with external control devices. The system controller 16 supplies control signals via line 15 to other components of the motor drive 10, as will be described. The functions of the system controller 16 and the other components of the motor drive are performed by one or more microcomputers which execute software programs that implement those functions.

In response to these commands, the system controller 16 produces a velocity command ωc that indicates a desired velocity for the motor 12. The velocity command ωc is applied to a standard velocity regulator 18 which also receives a position signal Mp from an encoder 20 attached to the motor 12. The encoder 20 provides either a digital word indicating absolute angular position of the shaft of the motor or a series of pulses indicating incremental motion and direction. By monitoring the change of that position signal Mp with time, the velocity regulator 18 is able to determine the actual motor velocity. The velocity regulator 18 produces a commanded torque τc in response to the relationship between the commanded velocity and the actual velocity. The commanded torque is generated in a conventional manner and indicates how the motor 12 should be operated in order to achieve the commanded velocity. For example, if the motor is operating slower than the commanded velocity, a positive torque has to be generated in the motor in order to increase its velocity. Similarly, a negative commanded torque is generated when the motor is operating faster then desired.

The commanded torque produced on line 22 is applied to an input of a conventional motor control 24 which responds by producing a set of control signals for a standard PWM inverter 26. The control signals operate the PWM inverter 26 which switches DC voltage from an AC-DC converter 25 to generate PWM waveforms that are applied to the stator coils of the three-phase electric motor 12. The PWM waveforms are varied to control the motor velocity, as is well understood by those skilled in motor control.

Figure 2:
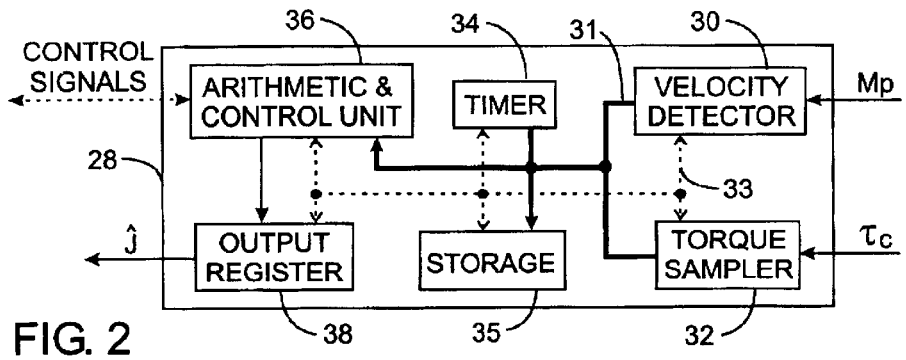
FIG. 2 is a functional block diagram of an inertia module in the motor drive.

In addition to receiving the velocity command ωc and the encoder signal, the velocity regulator 18 also receives a value indicating the inertia Ĵ of the motor 12 and the mechanical system driven by the motor, hereinafter collectively referred to as the "motor system". The inertia is used to set circuit gains in the velocity regulator 18. The value of the inertia is supplied by an inertia module 28, the details of which are shown in FIG. 2. The inertia module 28 contains a velocity detector 30 which processes the position signal Mp from the encoder 20 to determine the actual velocity of the motor 12. A torque sampler 32 periodically acquires samples of the commanded torque τc produced by the velocity regulator 18. A timer 34 is provided to measure time intervals between certain events which will be described. The data produced by the velocity detector 30, the torque sampler 32, and the timer 34 are sent via a data bus 31 to a storage device 35, such as the memory of the microcomputer that implements the inertia module 28 functionality. An arithmetic and control unit 36 controls operation of the via control lines 33 and derives the estimate of the motor system inertia from the stored data, as described subsequently. The resultant inertia value Ĵ is held in an output register 38 from which it is communicated to the velocity regulator 18.

The inertia of the motor system is relatively constant and needs to be determined only upon initial commissioning of the motor 12 or whenever changes are made to the motor system which affect its inertia. On those occasions, the operator enters the appropriate command into the control panel 14 which causes the motor drive to commence an inertia determination procedure. That operator command causes the system controller 16 to issue a control signal over lines 15 which instructs the inertia module 28 to enter the determination mode. The inertia can be determined even when a constant load is applied to the motor.

Figure 4A:
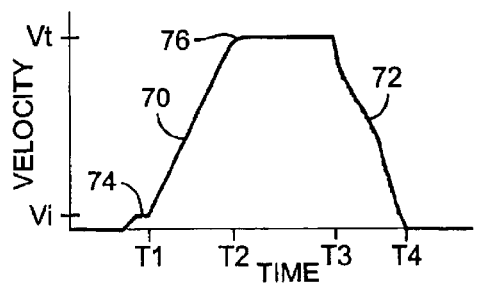
FIGS. 4A and B are graphs depicting variation of velocity and torque, respectively, as a motor accelerates and the decelerates.
Figure 3:
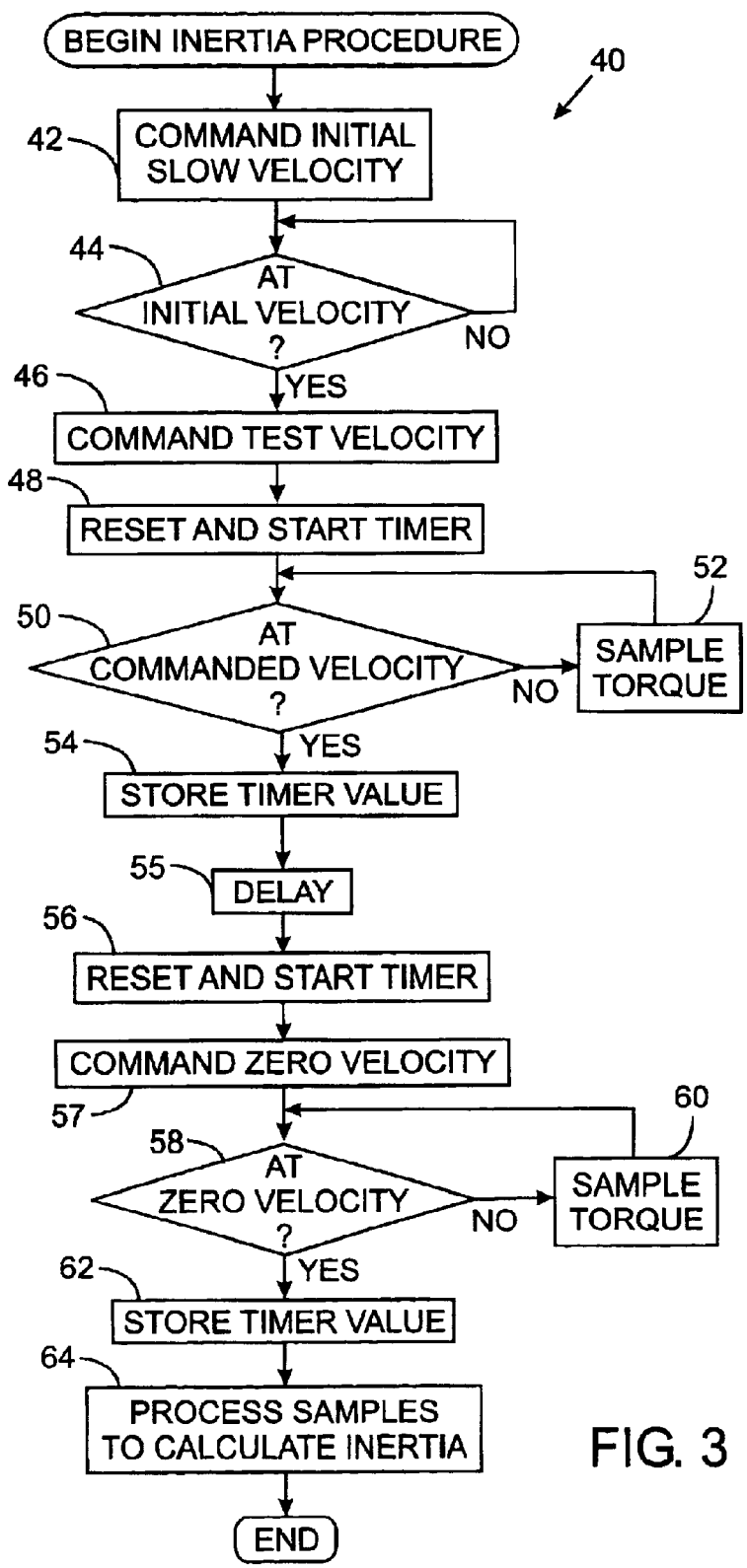
FIG. 3 is a flowchart of the present method for estimating the motor inertia.

The inertia determination procedure 40 is depicted by the flowchart in FIG. 3 and operates the motor through a velocity profile shown in FIG. 4A which has an acceleration phase 70 and a deceleration phase 72. This procedure begins at step 42 where the system controller 16 in FIG. 1 produces a velocity command ωc to operate the motor 12 at a relatively slow initial velocity Vi. The velocity regulator 18 responds to this velocity command by issuing a corresponding torque command τc to the motor control 24. This causes the motor control 24 to operate the PWM inverter 26 in a manner that applies electricity to accelerate the motor 12 to the initial velocity Vi at profile plateau 74. Operating the motor at a relatively slow initial velocity prior to acquiring data for the inertia computation ensures that any lost motion in a transmission or mechanical linkage of the motor system occurs before data acquisition. At step 44, the arithmetic and control unit 36 detects when this initial velocity has been achieved.

Figure 4B:
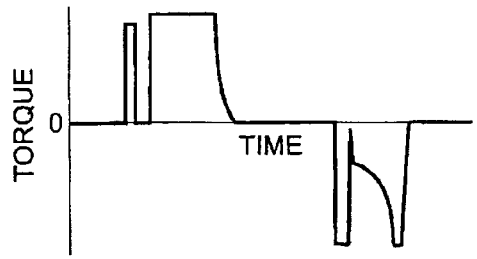

When that occurs, a control signal is sent to the system controller 16 which responds at step 46 by issuing a new commanded velocity designating a test velocity Vt to which the motor 12 is to accelerate. Then at step 48, the timer 34 is reset and started to measure the amount of time to accelerate to the test velocity. Thereafter the arithmetic and control unit 36 examines the output data from the velocity detector 30 at step 50 to determine whether the motor 12 has reached the test velocity. If that is not yet the case, the inertia determination procedure 40 branches to step 52 at which the torque sampler 32 stores the value of the commanded torque τc in storage device 35. FIG. 4B illustrates the variation in torque during the exemplary velocity profile in FIG. 4A. Because of the nature of the feedback control loop that governs motor operation, it can be accurately assumed that the actual torque produced by the motor equals the commanded torque τc, eliminating the need to measure the torque of the motor directly. Therefore the sampling of the commanded torque can be considered as sampling the motor torque. The inertia determination procedure continues to loop through steps 50 and 52 taking samples periodically until the motor 12 reaches the test velocity Vt at point 76 on velocity profile of FIG. 4A. When the motor reaches the test velocity Vt, the value of the timer 34, corresponding to the interval between times T1 and T2, is stored in the storage device 35 at step 54.

Then at step 55 the inertia determination procedure 40 delays for a brief period to ensure that the motor operation stabilizes at the test velocity Vt.

Following that delay, the inertia module's arithmetic and control unit 36 resets the timer 34 to measure the duration of the deceleration phase 72 at step 56 and issues a control signal which causes the system controller 16 to produce a zero velocity command (ωc=0) at step 57. A velocity regulator 18 responds to the zero velocity command by producing a negative commanded torque τc to stop the motor 12. In many motor drives the velocity command during deceleration is limited in response to various control parameters. For example, the AC-DC converter 25 includes a regulator which limits the voltage on the DC supply bus between the AC-DC converter and the PWM inverter 26. During deceleration, electric current that is induced in the motor's stator coils by the rotating magnetic field flows into the DC supply bus. If that current produces an over voltage condition the AC-DC converter 25 activates the torque limiter 23 to reduce the commanded torque during deceleration. Thus although the velocity regulator is producing a constant negative commanded torque, the torque command value at the input of the motor control 24 varies due to system limiters. This dynamic limiting results in a non-linear deceleration and a varying motor torque as shown in FIGS. 4A and 4B.

Next at step 58, the arithmetic and control unit 36 begins examining the velocity signal from the encoder 20 to determine whether the motor has stopped, i.e., reached zero velocity. Until that occurs, the procedure periodically acquires samples of the torque command which are placed into storage at step 60. Eventually when the motor 12 stops, the inertia determination procedure branches to step 62 at which the value of the timer 34, corresponding to the interval between times T3 and T4, is stored in storage device 35 which completes the data acquisition.

Then at step 64, the stored torque samples and timer readings are employed to calculate the inertia of the motor system. The inertia is derived according the following equation, which is solved by the inertia module's arithmetic and control unit 36:

$$\hat{J} = \frac{\left|\frac{1}{N} \cdot \sum_{i=1}^{N} \tau a(i)\right| + \left|\frac{1}{M} \cdot \sum_{k=1}^{M} \tau d(k)\right|}{\left|\frac{\Delta Va}{ta}\right| + \left|\frac{\Delta Vd}{td}\right|} \quad (1)$$

where Ĵ is inertia in seconds, N is the number of torque samples acquired during the acceleration phase 70, τa(i) is the ith torque sample acquired during motor acceleration, M is the number of torque samples acquired during the deceleration phase 72, τd(k) is the kth torque sample acquired during motor deceleration, ΔVa is the net velocity change (Vt−Vi) during acceleration, ΔVd is the net velocity change (−Vt) during deceleration, ta is the acceleration time (T2−T1), and td is the deceleration time (T4−T3). The above equation employs the absolute values of the terms.

It should be appreciated that the average torque during acceleration is a positive value, whereas the average torque during deceleration is a negative value. Similarly the change in velocity ΔVa during acceleration phase is positive, and the velocity change ΔVd during the deceleration phase is negative. Therefore, equation (1) may be rewritten as:

$$\hat{J} = \frac{\frac{1}{N} \cdot \sum_{i=1}^{N} \tau a(i) - \frac{1}{M} \cdot \sum_{k=1}^{M} \tau d(k)}{\frac{\Delta Va}{ta} - \frac{\Delta Vd}{td}} \qquad (2)$$

in which the absolute values are not required and the plus signs have been replaced with minus signs (subtracting a negative value is equivalent to adding the absolute value of that negative value). Both methods can be generically referred to as summing the magnitudes of the respective values.

Therefore, the determination of the inertia Ĵ separately averages torque of the motor during the acceleration phase and the deceleration phase and then sums the magnitudes of those averages. The change in velocity during acceleration is divided by the acceleration time to derive the rate of acceleration. A similar derivation of the rate of deceleration involves dividing the change in velocity during the deceleration phase by the deceleration time. The inertia Ĵ of the motor system is the average torque magnitude sum divided by the sum of the magnitudes of the acceleration rate and the deceleration rate.

In installations where the motor always will accelerate at a constant rate, i.e. the acceleration phase is linear, a single torque sample can be acquired. The value of that single torque sample τa1 then is used in place of the average of the acceleration torque in the computation of the inertia as given by the expression:

$$\hat{J} = \frac{|\tau a 1| + \left|\frac{1}{M} \cdot \sum_{k=1}^{M} \tau d(k)\right|}{\left|\frac{\Delta Va}{ta}\right| + \left|\frac{\Delta Vd}{td}\right|}. \qquad (2)$$

Once the motor system inertia has been determined, it is stored in an output register 38 of the inertia module 28 and applied as an input to the velocity regulator 18.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for estimating inertia of an electric motor, said method comprising:

receiving a sensor signal from a sensor attached to the electric motor;

changing a velocity of the electric motor from a first velocity to a second velocity;

in response to the sensor signal, detecting a first rate of velocity change from the first velocity to the second velocity;

detecting a first average amount of torque produced by the electric motor while the velocity is changing, wherein the first average amount of torque is detected by acquiring a plurality of torque samples while the electric motor is changing velocity, each torque sample represents an amount of torque generated by the electric motor, and calculating an average of the plurality of torque samples; and deriving an inertia value as a function of the first rate of velocity change and the first average amount of torque.

2. The method as recited in claim 1 wherein the first velocity is greater than the second velocity.

3. The method as recited in claim 1 wherein detecting the first rate of velocity change comprises:

measuring an amount of time for the electric motor to change from the first velocity to the second velocity;

calculating a difference between the first velocity and the second velocity; and dividing the difference by the amount of time.

4. The method as recited in claim 1 wherein the first velocity is less than the second velocity.

5. The method as recited in claim 4 further comprising:

decreasing the velocity of the electric motor from a third velocity to a fourth velocity;

detecting a second rate of velocity change from the third velocity to the fourth velocity;

detecting a second average amount of torque produced by the electric motor while the velocity changes from the third velocity to the fourth velocity; and wherein the inertia value also is derived as a function of the second rate of velocity change and the second average amount of torque.

6. The method as recited in claim 2 further comprising:

increasing the velocity of the electric motor from a third velocity to a fourth velocity;

detecting a second rate of velocity change from the third velocity to the fourth velocity;

acquiring a torque value representing torque produced by the electric motor while the velocity changes from the third velocity to the fourth velocity; and wherein the inertia value also is derived as a function of the second rate of velocity change and the torque value.

7. A method for estimating inertia of an electric motor and a load connected to the electric motor, said method comprising:

accelerating the electric motor to produce a first change in velocity;

detecting a rate of acceleration which occurs while accelerating the electric motor;

detecting an amount of torque produced by the electric motor during the accelerating;

decelerating the electric motor to produce a second change in velocity;

detecting a rate of deceleration which occurs while decelerating the electric motor;

detecting an average amount of torque produced by the electric motor during the decelerating, wherein the average amount of torque is detected by acquiring a plurality of torque samples while the electric motor is decelerating, each torque sample represents an amount of torque generated by the electric motor, and calculating an average of the plurality of torque samples; and deriving an inertia value as a function of the amount of torque, the average amount of torque, the rate of acceleration, and the rate of deceleration.

8. The method as recited in claim 7 wherein accelerating the electric motor commences at a velocity that is greater than zero.

9. The method as recited in claim 7 wherein deriving an inertia value comprises dividing a sum of the magnitudes of the amount of torque and the average amount of torque by a sum of the magnitudes of the rate of acceleration and the rate of deceleration.

10. The method as recited in claim 7 wherein detecting a rate of acceleration comprises:

measuring an amount of time for the electric motor to make the first change in velocity; and dividing the magnitude of the first change in velocity by the amount of time.

11. The method as recited in claim 7 wherein detecting a rate of deceleration comprises:

measuring an amount of time for the electric motor to make the second change in velocity; and dividing the magnitude of the second change in velocity by the amount of time.

12. A method for estimating inertia of an electric motor and a load connected to the electric motor, said method comprising:

accelerating the electric motor from a first velocity to a second velocity;

detecting a rate of acceleration for the electric motor to accelerate to the second velocity;

detecting a first average amount of torque produced by the electric motor during the accelerating;

decelerating the electric motor from a third velocity to a fourth velocity;

detecting a rate of deceleration for the electric motor to decelerate to the fourth velocity;

detecting a second average amount of torque produced by the electric motor during the decelerating; and calculating an inertia value as a function of the first amount of average torque, the second average amount of torque, the rate of acceleration, and the rate of deceleration.

13. The method as recited in claim 12 wherein calculating an inertia value comprises dividing a sum of the magnitudes of the first average amount of torque and the second average amount of torque by a sum of the magnitudes of the rate of acceleration and rate of deceleration.

14. The method as recited in claim 12 wherein the second velocity and the third velocity are substantially equal.

15. The method as recited in claim 12 wherein the first velocity is greater than zero.

16. The method as recited in claim 12 wherein detecting a first average amount of torque comprises:

while the electric motor is accelerating, acquiring a plurality of torque samples, each representing an amount of torque generated by the electric motor; and calculating an average of the plurality of torque samples.

17. The method as recited in claim 12 wherein detecting a rate of acceleration comprises:

measuring an amount of time for the electric motor to accelerate from the first velocity to the second velocity; and dividing a difference between the first velocity and the second velocity by the amount of time.

18. The method as recited in claim 12 wherein detecting a second average amount of torque comprises:

while to electric motor is decelerating, acquiring a plurality of torque samples, each representing an amount of torque generated by the electric motor; and calculating an average of the plurality of torque samples.

19. The method as recited in claim 12 wherein detecting a rate of deceleration comprises:

measuring an amount of time for the electric motor to decelerate from the third velocity to the fourth velocity; and dividing a difference between the third velocity and the fourth velocity by the amount of time.

20. A method for estimating inertia of an electric motor and a load connected to the electric motor, said method comprising:

accelerating the electric motor from a first velocity to a second velocity, thereby producing a first velocity change, $\Delta Va$;

measuring a first amount of time, ta, for the electric motor to accelerate from the first velocity to the second velocity;

acquiring a first plurality of torque samples while the electric motor is accelerating, each torque sample represents an amount of torque generated by the electric motor;

decelerating the electric motor from a third velocity to a fourth velocity, thereby producing a second velocity change, $\Delta Vd$;

measuring a second amount of time, td, for the electric motor to decelerate from the third velocity to the fourth velocity;

acquiring a second plurality of torque samples while the electric motor is decelerating, each torque sample represents an amount of torque generated by the electric motor; and deriving an inertia value as a function of the first velocity change, the second velocity change, the first amount of time, the second amount of time; the first plurality of torque samples, and the second plurality of torque samples.

21. The method as recited in claim 20 wherein deriving an inertia value comprises:

calculating an average of the first plurality of torque samples to produce a first torque average;

calculating an average of the second plurality of torque samples to produce a second torque average;

dividing the first velocity change by the first amount of time to derive an acceleration rate;

dividing the second velocity change by the second amount of time to derive a deceleration rate; and dividing a sum of the first torque average and the second torque average by a sum of the acceleration rate and the deceleration rate.

22. The method as recited in claim 20 wherein the inertia value $\hat{J}$ is derived according to the equation:

$$\hat{j} = \frac{\frac{1}{N} \cdot \sum_{i=1}^{N} \tau a(i) - \frac{1}{M} \cdot \sum_{k=1}^{M} \tau d(k)}{\frac{\Delta Va}{ta} - \frac{\Delta Vd}{td}}$$

where N is the number of torque samples in the first plurality of torque samples, τa(i) is the with torque sample in the first plurality of torque samples, M is the number of torque samples of in the second plurality of torque samples, and τd(k) is the kth torque sample in the second plurality of torque samples.

23. The method as recited in claim 20 wherein the first velocity is greater than zero.

24. The method as recited in claim 20 wherein deriving an inertia value comprises:

calculating an average of the first plurality of torque samples to produce a first torque average; and calculating an average of the second plurality of torque samples to produce a second torque average.

25. The method as recited in claim 20 wherein deriving an inertia value comprises:

dividing the first velocity change by the first amount of time to derive an acceleration rate; and dividing the second velocity change by the second amount of time to derive a deceleration rate.

\* \* \* \* \*